(12) United States Patent
Batek et al.

(10) Patent No.: US 11,846,959 B2
(45) Date of Patent: Dec. 19, 2023

(54) HOUSEHOLD ENERGY MANAGEMENT SYSTEM UTILIZING MULTIPLE SCALES OF TIME

(71) Applicant: WHIRLPOOL CORPORATION, Benton Harbor, MI (US)

(72) Inventors: Andrew W. Batek, St. Joseph, MI (US); Jason Schneemann, St. Joseph, MI (US); Kevin Y. Zhang, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 305 days.

(21) Appl. No.: 17/147,512

(22) Filed: Jan. 13, 2021

(65) Prior Publication Data

US 2022/0221890 A1  Jul. 14, 2022

(51) Int. Cl.

| | |
|---|---|
| *G05F 1/66* | (2006.01) |
| *H02J 13/00* | (2006.01) |
| *H02J 3/14* | (2006.01) |
| *G01D 4/14* | (2006.01) |
| *G06Q 50/06* | (2012.01) |
| *G05F 1/06* | (2006.01) |

(52) U.S. Cl.
CPC ................ *G05F 1/06* (2013.01); *G01D 4/14* (2013.01); *H02J 3/144* (2020.01); *H02J 13/00004* (2020.01); *G06Q 50/06* (2013.01); *H02J 2310/14* (2020.01)

(58) Field of Classification Search
CPC .... G05F 1/66; G01D 4/14; H02J 3/144; H02J 3/00; H02J 2203/10; H02J 2203/20; G06Q 50/06; G06Q 10/06315
See application file for complete search history.

(56) References Cited

U.S. PATENT DOCUMENTS

| | | |
|---|---|---|
| 6,906,617 B1 | 6/2005 | Van der Meulen |
| 7,010,363 B2 | 3/2006 | Donnelly et al. |
| 8,386,087 B2 | 2/2013 | Spicer et al. |
| 8,799,481 B2 | 8/2014 | Chamarti et al. |
| 8,818,566 B2 | 8/2014 | Besore et al. |
| 8,914,160 B2 | 12/2014 | Yang et al. |
| 8,930,037 B2 | 1/2015 | Brian et al. |

(Continued)

*Primary Examiner* — Thomas C Lee
*Assistant Examiner* — Anzuman Sharmin
(74) *Attorney, Agent, or Firm* — Price Heneveld LLP

(57) ABSTRACT

An electricity management system for a residential setting includes a controller that is coupled with a plurality of appliances. A plurality of sensors are coupled with the controller and respectively coupled to the plurality of appliances. The controller cooperates with the sensors and the appliances to generate a demand response plan for delivering electrical power to the plurality of appliances. The demand response plan includes a shifting strategy that regulates a delivery of electrical power based upon a regional pattern of electrical consumption, a shedding strategy that maintains a household consumption of electrical power below a household upper consumption limit and a modulating strategy based upon the respective operating cycles of the plurality of appliances that prevents a simultaneous peak electrical event within more than one appliance of the plurality of appliances. The shifting strategy, the shedding strategy and the modulating strategy are implemented contemporaneously.

18 Claims, 10 Drawing Sheets

(56) References Cited

U.S. PATENT DOCUMENTS

| | | | |
|---|---|---|---|
| 10,254,735 B2 | 4/2019 | Kim et al. | |
| 10,444,781 B2 | 10/2019 | Imes et al. | |
| 2005/0099747 A1* | 5/2005 | Zima | G05B 13/048 |
| | | | 361/62 |
| 2006/0276938 A1* | 12/2006 | Miller | G06Q 50/06 |
| | | | 705/412 |
| 2009/0207753 A1* | 8/2009 | Bieganski | G01D 4/004 |
| | | | 370/254 |
| 2011/0087382 A1* | 4/2011 | Santacatterina | H02J 3/14 |
| | | | 700/291 |
| 2011/0153106 A1* | 6/2011 | Drake | H04L 12/2829 |
| | | | 700/295 |
| 2011/0288905 A1* | 11/2011 | Mrakas | G06Q 10/06 |
| | | | 705/7.25 |
| 2012/0065798 A1* | 3/2012 | Finch | H02J 3/144 |
| | | | 700/295 |
| 2012/0065805 A1 | 3/2012 | Montalvo | |
| 2012/0193985 A1 | 8/2012 | Kim et al. | |
| 2013/0030553 A1 | 1/2013 | Lee et al. | |
| 2013/0066482 A1* | 3/2013 | Li | H02J 3/144 |
| | | | 700/297 |
| 2014/0067136 A1 | 3/2014 | Kim et al. | |
| 2017/0054299 A1* | 2/2017 | Gilbert | H02J 13/00004 |
| 2021/0125253 A1* | 4/2021 | Vega | G06Q 50/06 |
| 2022/0385064 A1* | 12/2022 | Cruickshank, III | G05B 15/02 |

\* cited by examiner

HOUSEHOLD ENERGY MANAGEMENT SYSTEM UTILIZING MULTIPLE SCALES OF TIME

BACKGROUND OF THE DISCLOSURE

The present disclosure generally relates to the delivery of electricity to various household appliances. More specifically, the device relates to an electricity management system for efficiently delivering electrical power to various household appliances to maintain the household energy consumption at a generally consistent level and to avoid spikes of energy consumption.

SUMMARY OF THE DISCLOSURE

According to one aspect of the present disclosure, an electricity management system for a residential setting includes a controller that is coupled with a plurality of appliances. A plurality of sensors are coupled with the controller and respectively coupled to the plurality of appliances. The controller cooperates with the plurality of sensors and the plurality of appliances to generate a demand response plan for delivering electrical power to the plurality of appliances. The demand response plan includes a shifting strategy that is configured to sequence activations of the plurality of appliances and a delivery of electrical power depending on a regional pattern of electrical consumption. The demand response plan includes a shedding strategy that is configured to maintain a household consumption of electrical power below a household upper consumption limit. The controller selectively deactivates at least one appliance of the plurality of appliances in response to the household consumption of electrical power reaching the household upper consumption limit. The demand response plan includes a modulating strategy. The respective operating cycles of the plurality of appliances are selectively conducted by the controller to maintain the household consumption of electrical power within a preferred consumption range that is below the household upper consumption limit. The shifting strategy, the shedding strategy and the modulating strategy are implemented contemporaneously.

According to another aspect of the present disclosure, an electricity management system for a residential setting includes a controller that is coupled with a plurality of appliances. A plurality of sensors are coupled with the controller and respectively coupled to the plurality of appliances. The controller cooperates with the plurality of sensors and the plurality of appliances to generate a demand response plan for delivering electrical power to the plurality of appliances. The demand response plan includes a shifting strategy that regulates a delivery of electrical power based upon a regional pattern of electrical consumption. The demand response plan includes a shedding strategy that maintains a household consumption of electrical power below a household upper consumption limit. The demand response plan includes a modulating strategy based upon the respective operating cycles of the plurality of appliances that prevents a simultaneous peak electrical event within more than one appliance of the plurality of appliances. The shifting strategy, the shedding strategy and the modulating strategy are implemented contemporaneously.

According to yet another aspect of the present disclosure, a method for managing household electrical consumption includes monitoring electrical consumption to a plurality of appliances to determine respective operating cycles of the plurality of appliances and a household consumption of electrical power. A modulating strategy of a demand response plan is generated that is based upon the respective operating cycles of the plurality of appliances. A shedding strategy of the demand response plan is generated that is based upon the household consumption of electrical power in relation to a household upper consumption limit. A shifting strategy of the demand response plan is generated that is based upon a regional pattern of electrical consumption. The modulating strategy, the shedding strategy and the shifting strategy are operated contemporaneously.

These and other features, advantages, and objects of the present disclosure will be further understood and appreciated by those skilled in the art by reference to the following specification, claims, and appended drawings.

Figure 1:
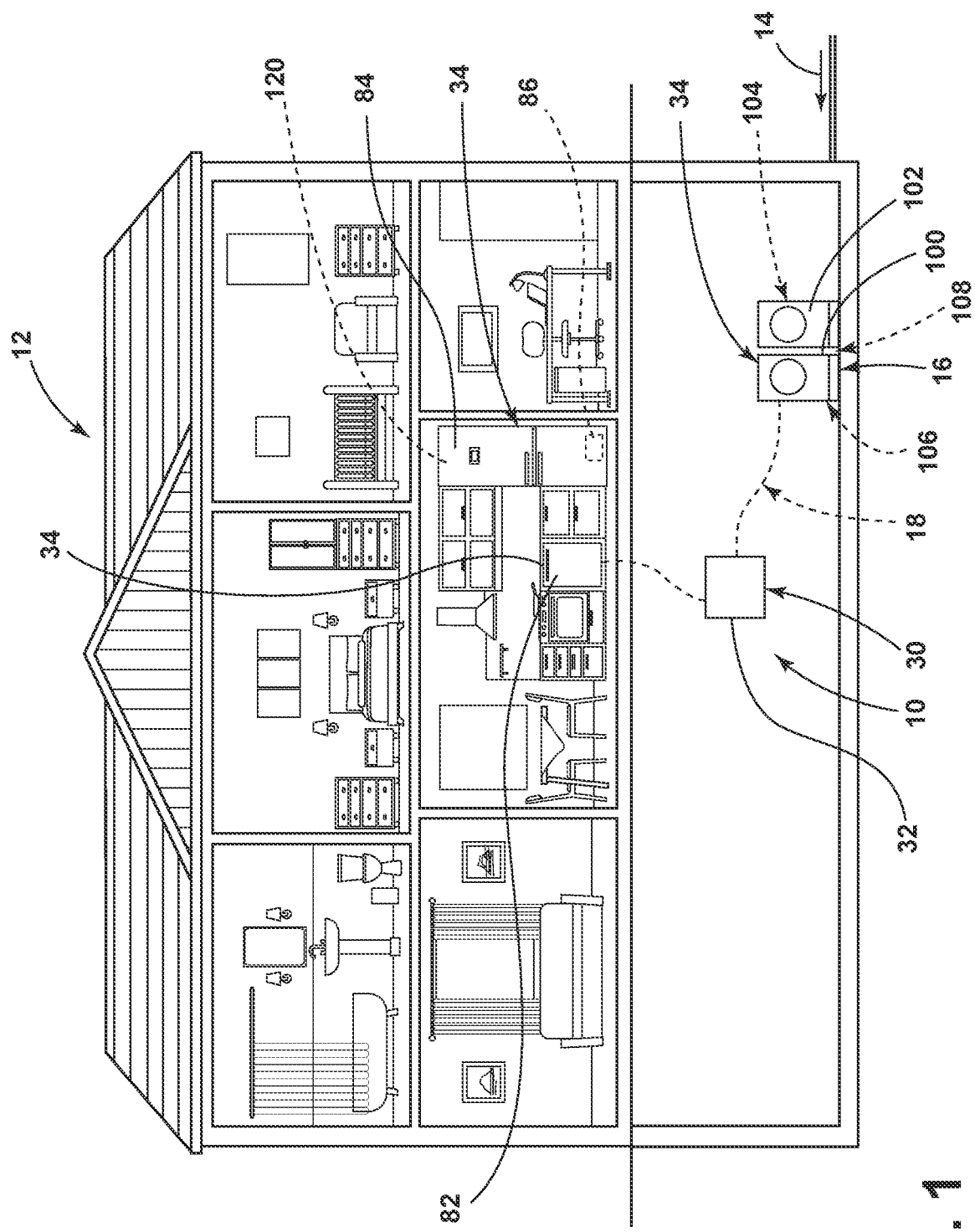
FIG. 1 is a schematic diagram illustrating a household utilizing various electrically powered consumer appliances.

The components in the figures are not necessarily to scale, emphasis instead being placed upon illustrating the principles described herein.

DETAILED DESCRIPTION

The present illustrated embodiments reside primarily in combinations of method steps and apparatus components related to an electricity management system that generates a demand response plan for managing usage of electrical power within a household. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front"

shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-5, reference numeral 10 generally refers to a demand response plan that is incorporated within a residential setting, such as within a household 12 for managing the delivery of electrical power 14 and the consumption thereof. The demand response plan 10 monitors various electrical appliances 16 within the household 12 and utilizes various strategies for delivering electrical power 14 so that the household consumption 18 of electrical power 14 remains within a preferred consumption range 20 and below a household upper consumption limit 22. The demand response plan 10 uses various timescales 24 for implementing these strategies, where these timescales 24 can be according to months or seasons, according to hours and days, and according to seconds, minutes, and hours. Other timescales 24 may be utilized to generate the demand response plan 10 and the various strategies thereof. These various timescales 24 and how the various strategies of the demand response plan 10 use these timescales 24 will be discussed more fully below.

According to the various aspects of the device, as exemplified in FIGS. 1-5, an electricity management system 30 for the household 12 or other residential setting includes a controller 32 that is coupled with a plurality of appliances 16. The household 12 can be in the form of a standalone residence, a condominium or townhouse setting, urban setting, apartment complexes, subdivisions, rural settings, and other similar residential settings. A plurality of sensors 34 are coupled with the controller 32 and are respectively coupled to the plurality of appliances 16. The controller 32 operates with the plurality of sensors 34 and the plurality of appliances 16 to generate the demand response plan 10 for delivering electrical power 14 to the plurality of appliances 16.

Referring again to FIGS. 1-5, the demand response plan 10 includes a shifting strategy 36 that is configured to sequence activations 38 of the plurality of appliances 16 and the delivery of electrical power 14 according to a regional pattern 40 of electrical consumption 42. The demand response plan 10 also includes a shedding strategy 50 that is configured to maintain a household consumption 18 of electrical power 14 below a household upper consumption limit 22. To accomplish this, the controller 32 can selectively activate, selectively deactivate and delay various activations 38 of at least one appliance 16 of the plurality of appliances 16. This activating, deactivating and delaying of the various appliances 16 can be in response to the household consumption 18 of electrical power 14 reaching or at least nearing the household upper consumption limit 22. The demand response plan 10 also includes a modulating strategy 60. In the modulating strategy 60, the respective operating cycles 62 of the plurality of appliances 16 are selectively conducted and sequenced by the controller 32 to maintain the household consumption 18 of electrical power 14 within the preferred consumption range 20. This preferred consumption range 20 is typically below the household upper consumption limit 22. In implementing the demand response plan 10, the shifting strategy 36, the shedding strategy 50, and the modulating strategy 60 are implemented contemporaneously and can overlap with one another, as schematically exemplified in FIG. 2. In addition, the demand response plan 10 can operate across a range of timescales 24. These timescales 24 can range from as short as seconds to long-run time scales along the order of months to seasons and longer timeframes.

Figure 2:
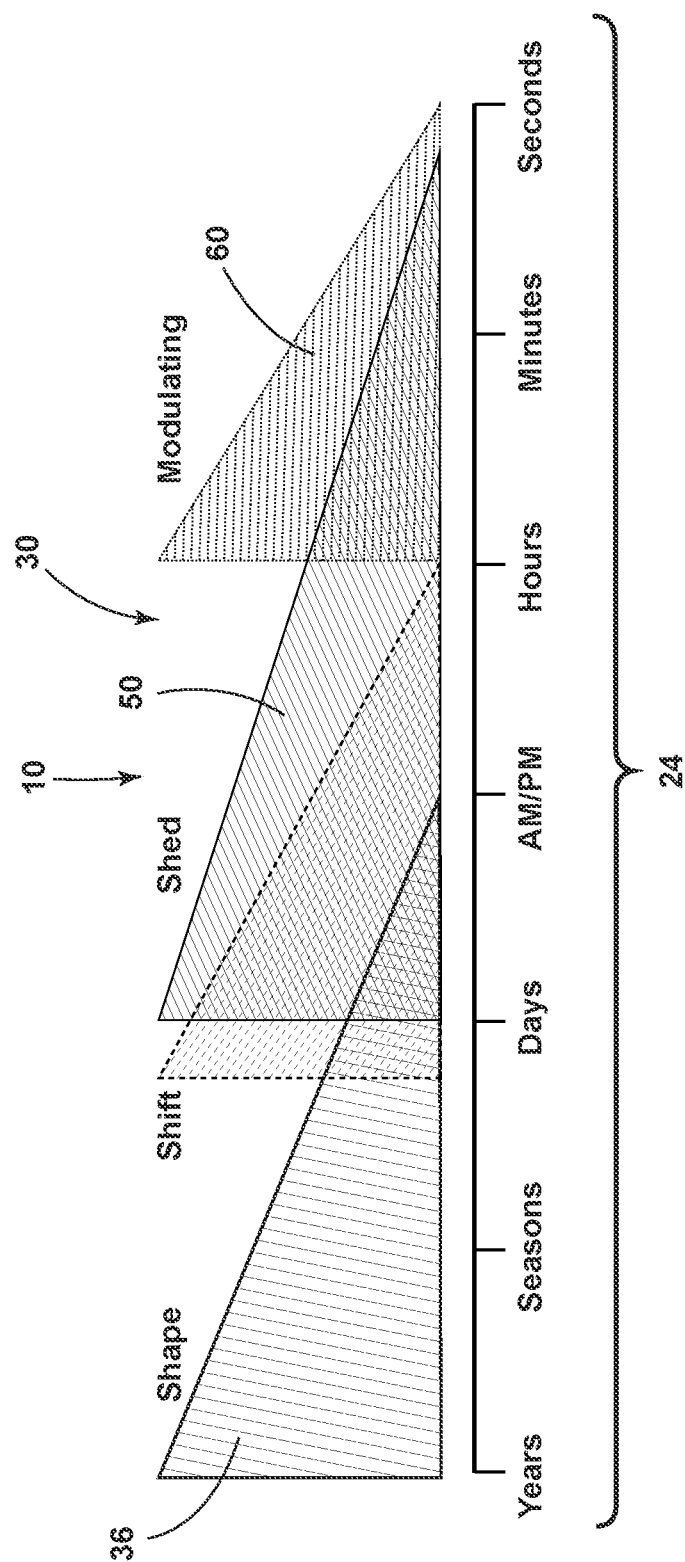
FIG. 2 is a schematic diagram illustrating an aspect of a demand response plan showing the various strategies and their relation to time scales.
Figure 3:
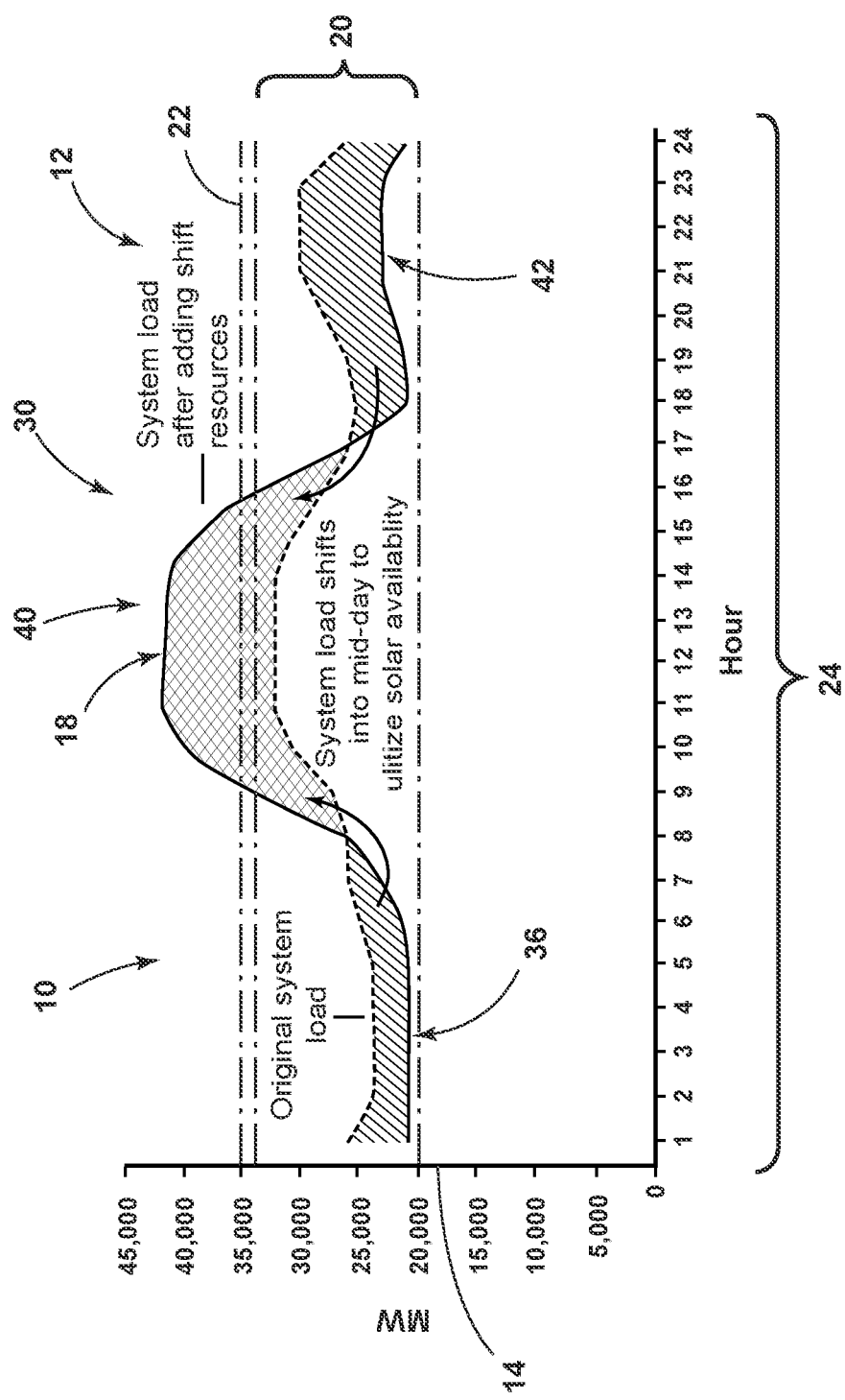
FIG. 3 is a schematic diagram illustrating an aspect of the shifting strategy of the demand response plan.

Referring now to FIGS. 1-3, the shifting strategy 36 typically refers to longer term changes that impact the various power consumption profiles 70 of the plurality of appliances 16. The changes produced by the shifting strategy 36 can be shaped by various factors that can include, but are not limited to, utility pricing information, availability of solar power and other alternative energy sources, behavioral influence and efficiency improvements related to the provision of electrical power 14, users of the appliance 16 and the plurality of appliances 16 themselves. Using pricing information, the controller 32 can monitor fluctuations in the cost of electrical power 14 and determine what time periods may be most efficient for the plurality of appliances 16 to operate in order to maximize the resources of the user. In addition, the plurality of appliances 16, in combination with the controller 32, can inform the user about the optimal times to utilize certain appliances 16. The availability of solar power may allow for activations 38 of one or more appliances 16 to occur during daylight hours such that the activations 38 can be operated, at least partially, using an alternative energy source to operate the appliance 16. These alternative energy sources can include, but are not limited to, solar, wind, geothermal, hydroelectric, and others.

By way of example, and not limitation, the controller 32 and the plurality of appliances 16 can inform the user about fluctuations in the cost of electrical power 14 and the availability of alternative energy sources that may inform the user about when to operate the appliances 16, or when not to operate the appliances 16. In this manner, the controller 32 and the plurality of appliances 16 can take advantage of time-of-use pricing models of electrical power 14. In addition, these prompts can help to produce behavioral changes within the household 12 that can be used to manage the household consumption of electrical power 14.

It is contemplated that the controller 32 can be incorporated within the household 12, can be incorporated within one or more of the appliances 16 or can be incorporated as part of a cloud-based computing network, an internet-of-things (IoT) device, combinations thereof and other similar devices. In addition, the controller 32 can be at least partially operated through the electrical grid and grid signals provided by the electrical grid and components thereof. The controller 32 can also be at least partially incorporated within certain emissions monitoring facilities that monitor marginal set off emissions related to the electrical grid and other utilities.

In addition, as part of the shifting strategy 36, behavioral influences can be utilized for changing the behavior of users, over time, through various incentives that may be communicated to the users. Certain cost versus comfort trade-offs can be suggested to the user of the appliances 16. These can include behaviors that suggest utilizing one or more of the plurality of appliances 16 during certain times of day when overall power consumption in the immediate area or within the region may be lower. Certain other behavioral suggestions can be communicated to the user via the controller 32 and the plurality of appliances 16.

Within the shifting strategy 36, operating the appliances 16 according to various efficiency plans can be utilized for increasing the efficiency of the appliances 16 themselves. These efficiencies are also realized in relation to the other appliances 16 within the household 12 as well as the overall household consumption of electrical power 14.

Figure 4:
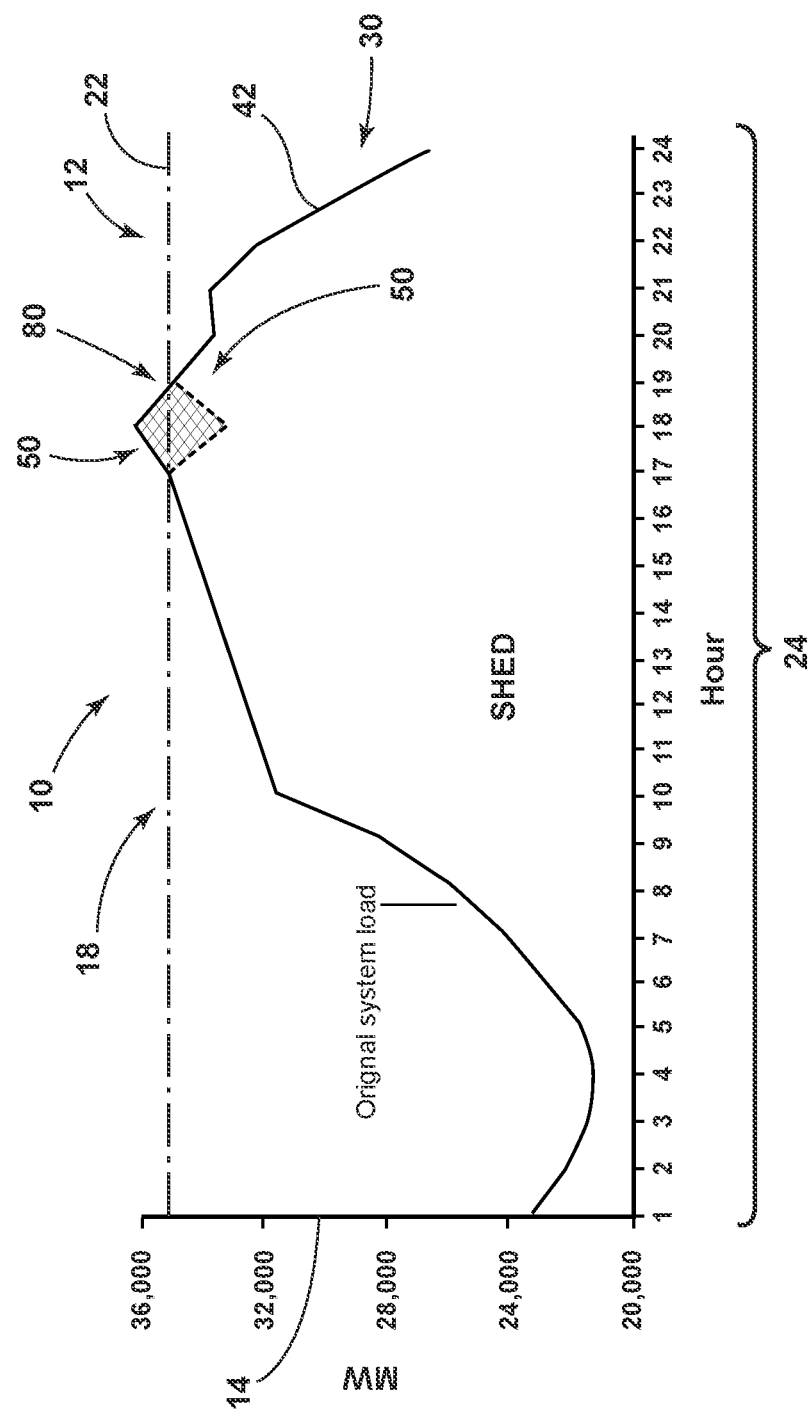
FIG. 4 is a schematic diagram illustrating an aspect of the shedding strategy of the demand response plan.

Referring now to FIGS. 1, 2, and 4, the shedding strategy 50 of the demand response plan 10 can typically be used to take advantage of patterns of electrical consumption 42 within a household 12 throughout a typical day as well as atypical days. In general, households 12 experience a ramp up 80 of the household consumption 18 of electrical power 14 during evening time hours. Accordingly, during this ramp up 80, the controller 32, in combination with the plurality of appliances 16, can suggest a delay in an activation 38 of a particular appliance 16 until after this ramp up 80 of electrical consumption 42 has at least partially abated. In certain aspects of the shedding strategy 50, one or more of the appliances 16 are shut off and electrical power 14 to the appliances 16 is stopped in order to prevent the household consumption 18 of electrical power 14 from reaching the household upper consumption limit 22. This can typically occur in a black-out or brown-out condition. In such a condition, signals from the electrical grid can be received by the controller 32 for implementing the shedding strategy 50. The shedding strategy 50 is implemented to decrease the household consumption 18 of electrical power 14 at certain periods of the day, such as during a brown-out or black-out condition, or, in certain cases, during the ramp up 80.

It is also contemplated that in a brown-out or a black-out condition, the shedding strategy 50 can be used in combination with the shifting strategy 36. Through this cooperative action of these strategies 50, 36, when this shut off occurs, the controller 18 can communicate to the user that the one or more appliances 16 needs to be restarted at a later time. It is contemplated that the controller 18 can suggest a better time to restart the appliance 16 or can automatically restart the appliance 16 at the more appropriate time. The shedding strategy 50 is implemented to decrease the household consumption 18 of electrical power 14 at certain periods of the day, such as the ramp up 80.

By way of example, and not limitation, activating a dishwasher 82 during the evening hours, such as after dinner, may result in the dishwasher 82 being delayed by the controller 32 until after the evening ramp up 80 of electrical consumption 42 has abated. This would have the effect of initiating activation 38 of the dishwasher 82 after a certain time, such as after 2:00 AM. With regard to other appliances 16, it may result in a delay of a successive activation 38 of a particular appliance 16. In the case of a refrigerator 84, a compressor 86, which may typically activate every ten minutes, for example, may be adjusted using the shedding strategy 50 to activate every twelve minutes, or some other time frame, to lessen electrical consumption 42 during particular times of the day. Using the shedding strategy 50, the household consumption of electrical power 14 can be maintained below a household upper consumption limit 22. Accordingly, peaks in the household consumption of electrical power 14 can be minimized to maintain the household consumption 18 of electrical power 14 within a preferred consumption range 20.

Figure 5:
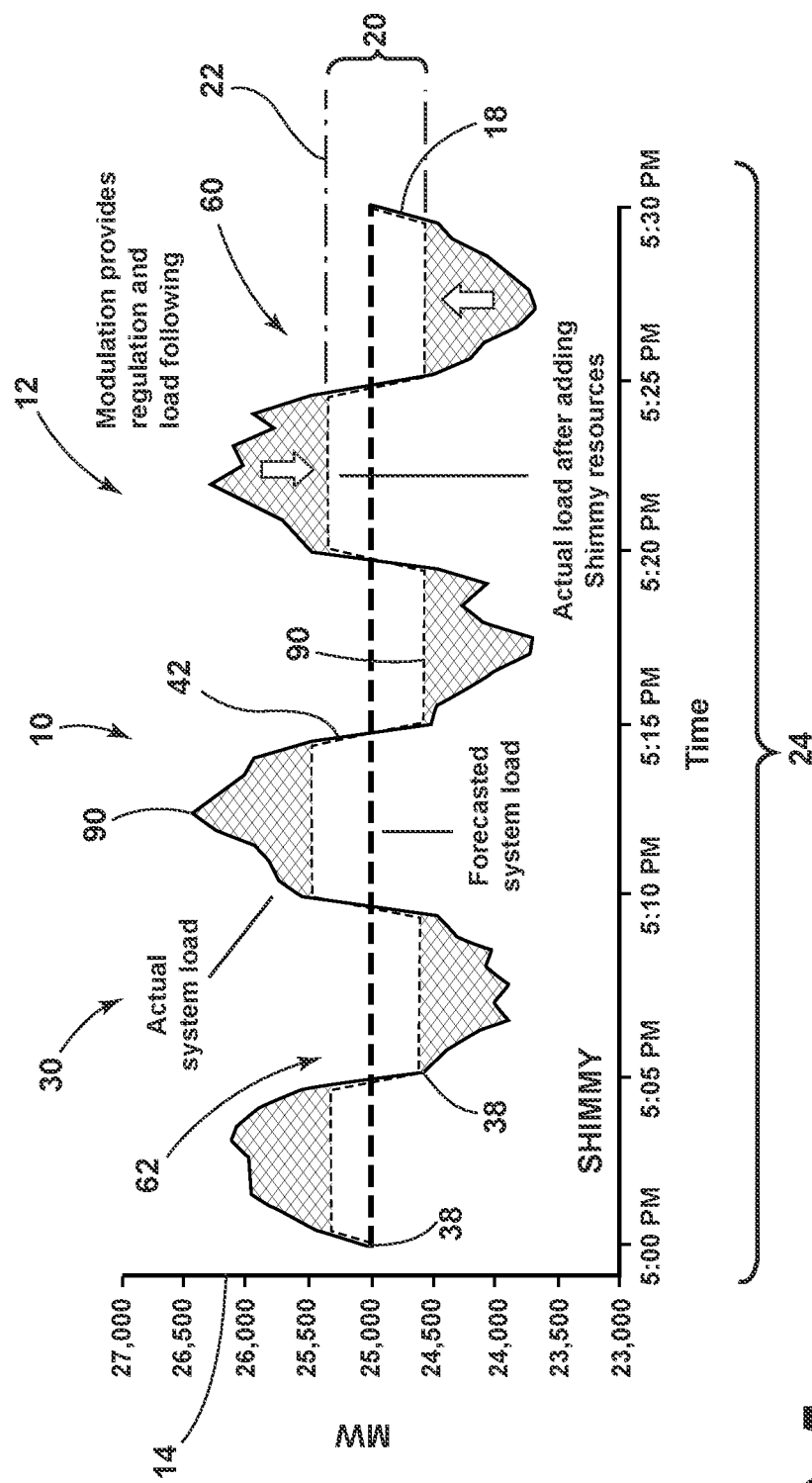
FIG. 5 is a schematic diagram illustrating an aspect of the modulating strategy of the demand response plan.

Referring now to FIGS. 1, 2, and 5, the modulating strategy 60 of the demand response plan 10 includes the sequencing and timing activations 38 for appliances 16. These activations 38 typically operate according to shorter timescales 24. These shorter timescales 24 typically relate to individual operating cycles 62, individual activations 38 and sequences that occur within the plurality of appliances 16. This modulating strategy 60 can result in changes to the sequencing and timing of operating cycles 62 of the plurality of appliances 16 so that respective peak electrical events 90 of more than one appliance 16 of the plurality of appliances 16 do not occur simultaneously, but can be adjusted to occur in a sequential pattern. Accordingly, the modulating strategy 60 uses the controller 32 in cooperation with the plurality of appliances 16 to adjust the sequencing and timing of respective operating cycles 62 of the plurality of appliances 16 so that peak electrical events 90 occur at separate and distinct periods of time.

By way of example, and not limitation, the plurality of appliances 16 can include, but are not limited to, refrigerators 84, dishwashers 82, and laundry appliances 16 such as washing machines 100, dryers 102 and combination washer/dryers. The electrical appliances can also include ovens, air conditioners, various cooking appliances, blowers, and other appliances that operate by using electrical power 14. Each of these appliances 16 typically includes one or more peak electrical events 90 during their respective operating cycles 62. In the case of a refrigerator 84, a peak electrical event 90 can include operation of a compressor 86 within the refrigeration system of the refrigerator 84. In the case of a dishwasher 82, a peak electrical event 90 can be in the form of operation of a heating element 104 or operation of various fluid pumps 106. In the case of a laundry appliance 16, a peak electrical event 90 can be in the form of an operation of a heating element 104 or a motor 108. Using the modulating strategy 60, these and other peak electrical events 90 can be sequenced to occur at dissimilar times so that multiple peak electrical events 90 do not occur contemporaneously.

In addition to the shifting strategy 36, the shedding strategy 50, and the modulating strategy 60, the demand response plan 10 can also include a shaping strategy. In certain instances, the shaping strategy can be incorporated with the shifting strategy 36. The shaping strategy 36 includes the controller 32 and the plurality of appliances 16 communicating with the user to shift certain behavioral actions that relate to a preferred time frame for activations 38 of appliances 16 and other activities relating to electrical consumption 42. As discussed above, this may include a recommendation to activate the dishwasher 82 at a period of time that is after the ramp up 80 of power consumption in many households 12. Other behavioral changes can be included within the demand response plan 10, where such behavioral changes can include, but are not limited to, increasing the temperature setting within a refrigerator 84, configuring a thermostat for an HVAC system of a household 12, using a dryer 102 at a lower heat setting, using laundry operating cycles 62 that require less time, preferring colder-water operating cycles 62 over warm or hot-water operating cycles 62 within washing machine 100, combinations thereof, and other similar behavioral strategies that can be suggested by the controller 32 or the plurality of appliances 16.

These recommendations that are incorporated into the demand response plan 10 can be provided based upon various factors and information that is derived from the appliance 16, the household, the household consumption 18 of electrical power 14 and other factors within the household. These recommendations can also be based upon outside conditions that are present in the electrical grid and components thereof in the form of grid signals as well as information related to marginal offset emissions. This grid and emission related information can be based upon a range of scales of geographic regions. These geographic regions can be a subdivision, a block, an apartment complex, a neighborhood, a city, a county, combinations thereof and other geographic scales.

Referring again to FIGS. 1-5, as discussed above, the demand response plan 10 is implemented through the shifting strategy 36, the shedding strategy 50, and the modulating strategy 60 over various timescales 24. At certain times, these various strategies may be incompatible or at least partially inconsistent with one another such that the planned activations 38 of one of the strategies may be required to take priority over the planned activations 38 of the other strategies. Accordingly, it is contemplated that the various strategies of the demand response plan 10 can be operated in a hierarchical framework. In this framework, the controller 32 can be configured to implement the modulating strategy 60 as the primary strategy. When the modulating strategy 60 is inconsistent with the shedding strategy 50 or the shifting strategy 36, the controller 32 is adapted to implement activations 38 relating to the modulating strategy 60 first. In addition, when the controller 32 implements the shedding strategy 50 as the secondary strategy, the shedding strategy 50 may be inconsistent with the shifting strategy 36. In this instance, the controller 32 can be configured to implement activations 38 relating to the shedding strategy 50 over inconsistent activations 38 relating to the shifting strategy 36. It is contemplated that other hierarchical frameworks can be implemented, such as the shifting strategy 36 being implemented over the shedding strategy 50. Typically, the strategy operating over the shorter timescale 24 will typically supersede the strategies operating over longer timescales 24.

Referring again to FIGS. 1-5, the electricity management system 30 for the household 12 can include the controller 32 that is coupled to the plurality of appliances 16. The plurality of sensors 34 are coupled with the controller 32 and are respectively coupled with the plurality of appliances 16. According to the various aspects of the device, the plurality of sensors 34 can include electrical current sensors, temperature sensors, and other similar sensors that can be coupled with the controller 32, as well as a processor 120 included within one or more of the plurality of appliances 16. Using the plurality of sensors 34, information related to the plurality of appliances 16 can be delivered to the controller 32 for storage and for processing to generate the demand response plan 10 as well as the shifting strategy 36, the shedding strategy 50, and the modulating strategy 60.

In addition to the sensors 34, the controller 32 for the electricity management system 30 can be coupled with various switches that deliver electrical power 14 to the various appliances 16. The controller 32 can also be coupled with the processors 120 for the various appliances 16, such that the controller 32 can coordinate operation of the plurality of appliances 16 and the individual cycles of the plurality of appliances 16. In this aspect of the device, the controller 32 can be configured to manage and control the operating cycles 62 of the appliances 16 by using the mechanisms, programming and circuitry of the plurality of appliances 16. This includes operation of the various peak electrical events 90 of the plurality of appliances 16. The controller 32 cooperates with the plurality of sensors 34 and the plurality of appliances 16 to generate the demand response plan 10 for delivering electrical power 14 to the plurality of appliances 16.

As discussed above, the demand response plan 10 includes the shifting strategy 36 that regulates the delivery of electrical power 14 based upon a regional pattern 40 of electrical consumption 42. This regional pattern 40 of electrical consumption 42 can be based upon the regional cost of electrical power 14 within a particular region, the availability of alternative energy sources, and other similar regionally-based factors. These factors can be based upon the time of year where certain seasons may have different prices and availability over other seasons. The controller 32 also cooperates with the plurality of sensors 34 and the plurality of appliances 16 to generate the shedding strategy 50 of the demand response plan 10. As discussed above, this shedding strategy 50 maintains a household consumption 18 of electrical power 14 below a household upper consumption limit 22. The controller 32, in combination with the plurality of sensors 34 and the plurality of appliances 16, also generates a modulating strategy 60. This modulating strategy 60 of the demand response plan 10 is typically based upon the respective operating cycles 62 of the plurality of appliances 16. The modulating strategy 60 operates to prevent a simultaneous operation of peak electrical events 90 within more than one of the appliances 16 of the plurality of appliances 16 within the household 12. The controller 32 implements the shifting strategy 36, the shedding strategy 50, and the modulating strategy 60 contemporaneously with one another to maximize the efficiency of household consumption 18 of electrical power 14 and to minimize the overall use of electrical power 14 within the household 12.

Figure 6:
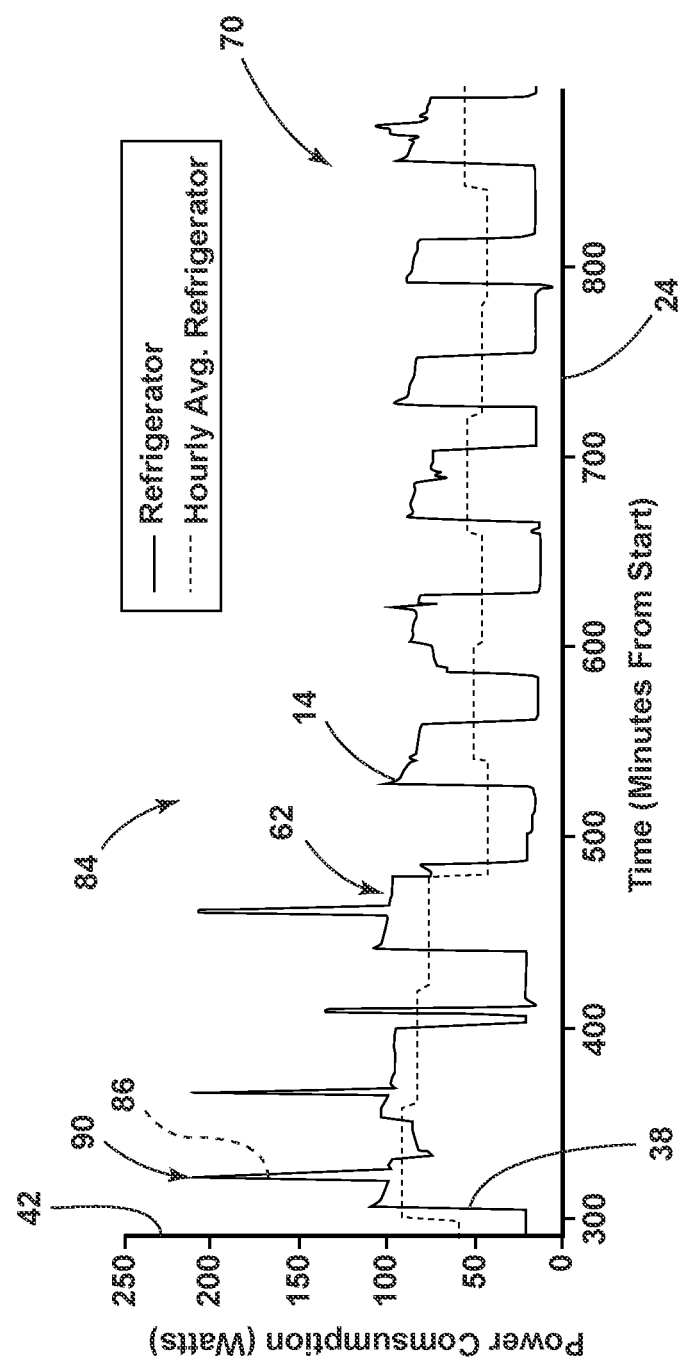
FIG. 6 is a schematic diagram illustrating an exemplary power consumption graph over time.
Figure 7:
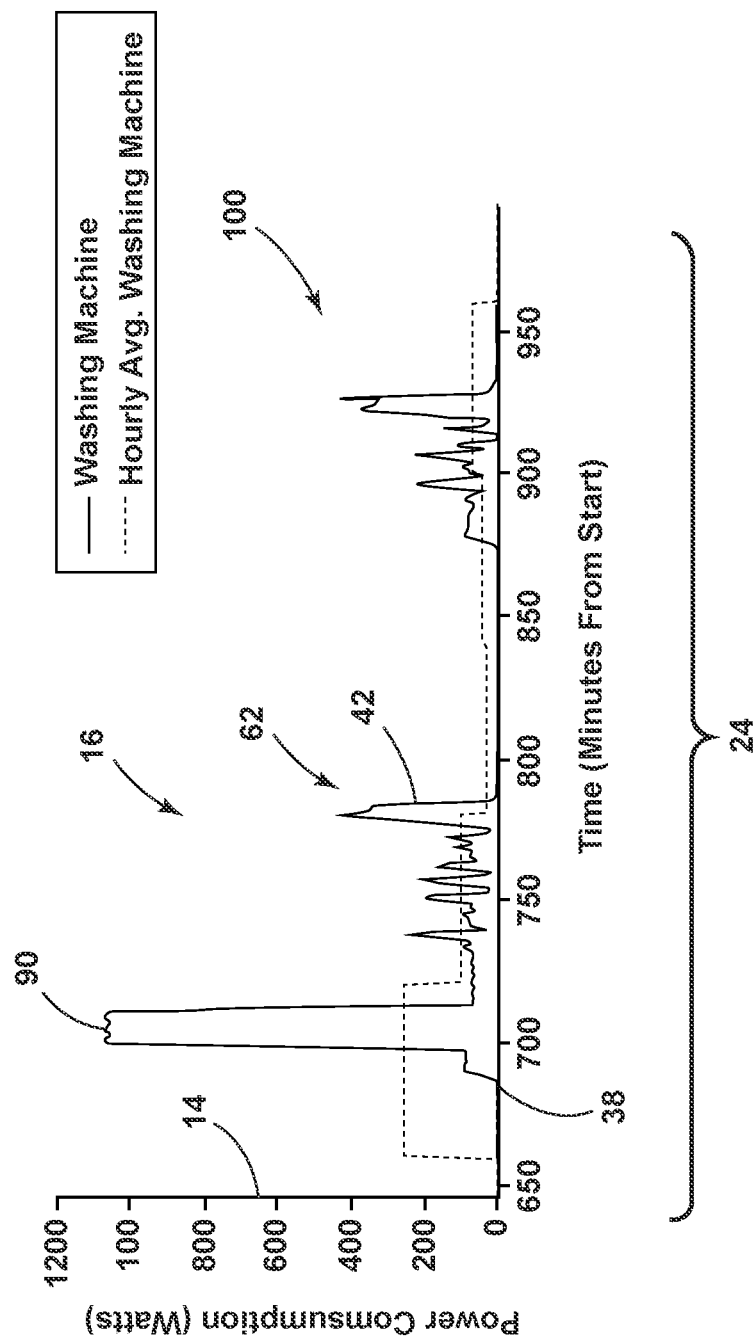
FIG. 7 is a schematic diagram illustrating an exemplary power consumption graph of a washing machine during an exemplary laundry cycle.

Referring now to FIGS. 1-6, the demand response plan 10 can be implemented with respect to various appliances 16. FIG. 6 reflects a typical electrical power 14 consumption profile 70 for a refrigerator 84 over time. This power consumption profile 70 reflects the operating cycles 62 of the compressor 86 for the refrigerator 84. The intermittent peak electrical events 90 can be indicative of operation of an ice maker, water dispenser, or defrost cycle for the appliance 16. Over time, the demand response plan 10 can be implemented for maximizing electrical consumption 42 within the refrigerator 84 to adjust the timing of the peak electrical events 90, and to also minimize the time the compressor 86 is operating. Using the shifting strategy 36, longer activations 38 of the compressor 86, as well as the activation 38 of the peak electrical events 90 can be saved for times when the cost of electrical power 14 decreases. These fluctuations in the cost of electrical power 14 can vary day-to-day as well as throughout the course of the day. Delaying the occurrence of these activations 38, such as a defrost cycle, may be useful in saving resources of the user in paying for the operating costs of the appliance 16.

The shedding strategy 50 and modulating strategy 60 of the refrigerator 84 can be implemented as well. The shedding strategy 50 can shift the consumption of electrical power 14 to different times of day without necessarily reducing the total expected energy consumption. The modulating strategy 60 can involve delaying or sequencing activations 38 of the operating cycles 62, or portions of operating cycles 62 for the refrigerator 84 over very short timescales 24 to prevent the activation 38 of a peak electrical event 90 at the same time as the peak electrical event 90 of another appliance 16 within the household 12.

With this in mind, it is contemplated that while the various strategies of the demand response plan 10 may be implemented in a hierarchical fashion, certain appliances 16 may also be treated hierarchically. The refrigerator 84, which is configured to maintain a certain temperature range over the life of the appliance 16, may be given priority over other appliances 16 that may be more capable of delaying activations 38 during the various cycles. Accordingly, the controller 32 takes these considerations into account when developing the demand response plan 10 and implementing the various strategies of the demand response plan 10.

It is also contemplated that various functions within a particular appliance 16 may also be given hierarchical priority. By way of example, and not limitation, an activation 38 of a compressor 86 maintaining a temperature within a refrigerating cavity will typically be given greater priority over the activation 38 of a defrost cycle or the activation 38 of an ice-making cycle. As noted previously, the compressor 86 is required to maintain the temperature within the appliance 16 within a consistent range over the life of the appliance 16. This necessarily requires the compressor 86 to activate in a regular fashion so this temperature can be maintained. Conversely, activation 38 of a defrost cycle or activation 38 of an ice maker may be delayed for at least minutes or hours. These hierarchical and priority-based considerations can be utilized by the controller 32 for generating and implementing the demand response plan 10.

Referring now to FIGS. 1-5 and 7, FIG. 7 reflects a power consumption profile 70 for a washing machine 100 over a particular operating cycle 62. As shown by the power consumption profile 70, certain peak electrical events 90 occur during this cycle in the form of activation 38 of a pump 106, operation of a heating element 104, and operation of a motor 108 to spin an impeller or drum of the laundry appliance 16. Similar implementations of the shifting strategy 36 can be utilized for the laundry appliance 16 as with the refrigerator 84. Some examples of recommendations offered using the shifting strategy 36 can take the form of determining when a particular laundry operating cycle 62 should be activated or when the controller 32 should actively delay implementation of a particular operating cycle 62.

Using the shedding strategy 50, implementations of certain operating cycles 62 can be stopped to avoid exceeding the household upper consumption limit 22 within a particular day. In this manner, the shedding strategy 50 reduces the household consumption 18 of electrical power 14 utilized by the laundry appliance 16. As discussed above, the shedding strategy 50 can cooperate with the shifting strategy 36 to shift when certain activations 38 occur within a particular day. In this manner, the shedding strategy 50 can be used to stop operation of appliance 16 in a black-out or brown-out condition. The shifting strategy 36 can be used to supplement the shedding strategy 50 to reactivate certain more necessary functions of various appliances 16. Accordingly, using the combination of the shedding and shifting strategies 50, 36 the time when certain operating cycles 62 activates may change depending on the various strategies of the demand response plan 10, as well as when certain activations 38 occur within the other appliances 16 within the household 12. By way of example, and not limitation, the activation of a dishwasher 82 can be cancelled while the initiation of a rinse cycle for a washing machine 100 may be delayed by at least a few minutes to avoid interfering with another peak electrical event 90 of another appliance 16. In addition, activation 38 of a spin cycle of the washing machine 100 may likewise be delayed.

Figure 8:
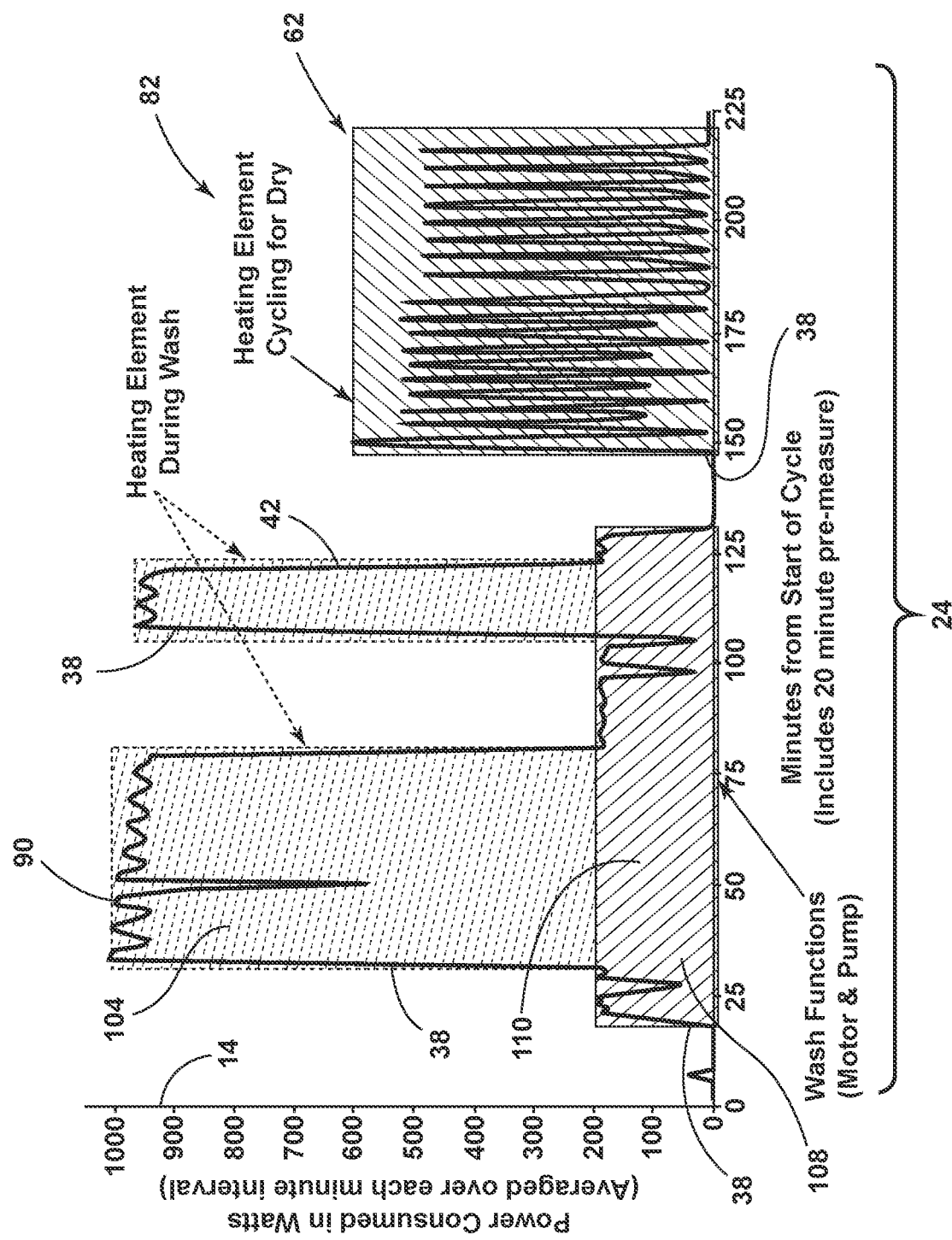
FIG. 8 is a schematic diagram illustrating a power consumption graph showing power consumption of a dishwasher and delineated according to the operation of the individual components of the dishwasher.
Figure 9:
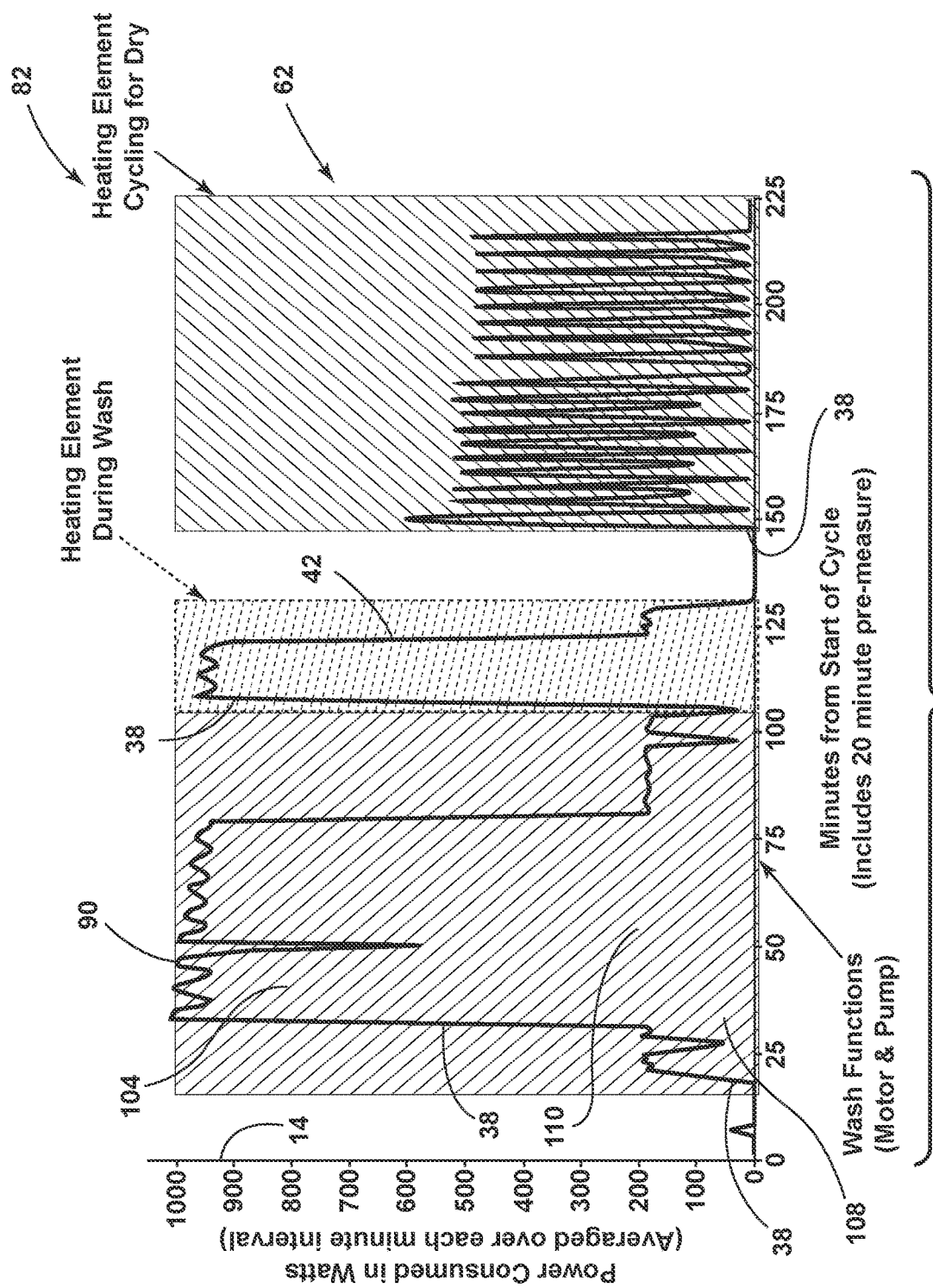
FIG. 9 is a schematic diagram illustrating the power consumption graph of FIG. 8 and delineating the graph according to phases of operation for a dishwashing cycle.
Figure 10:
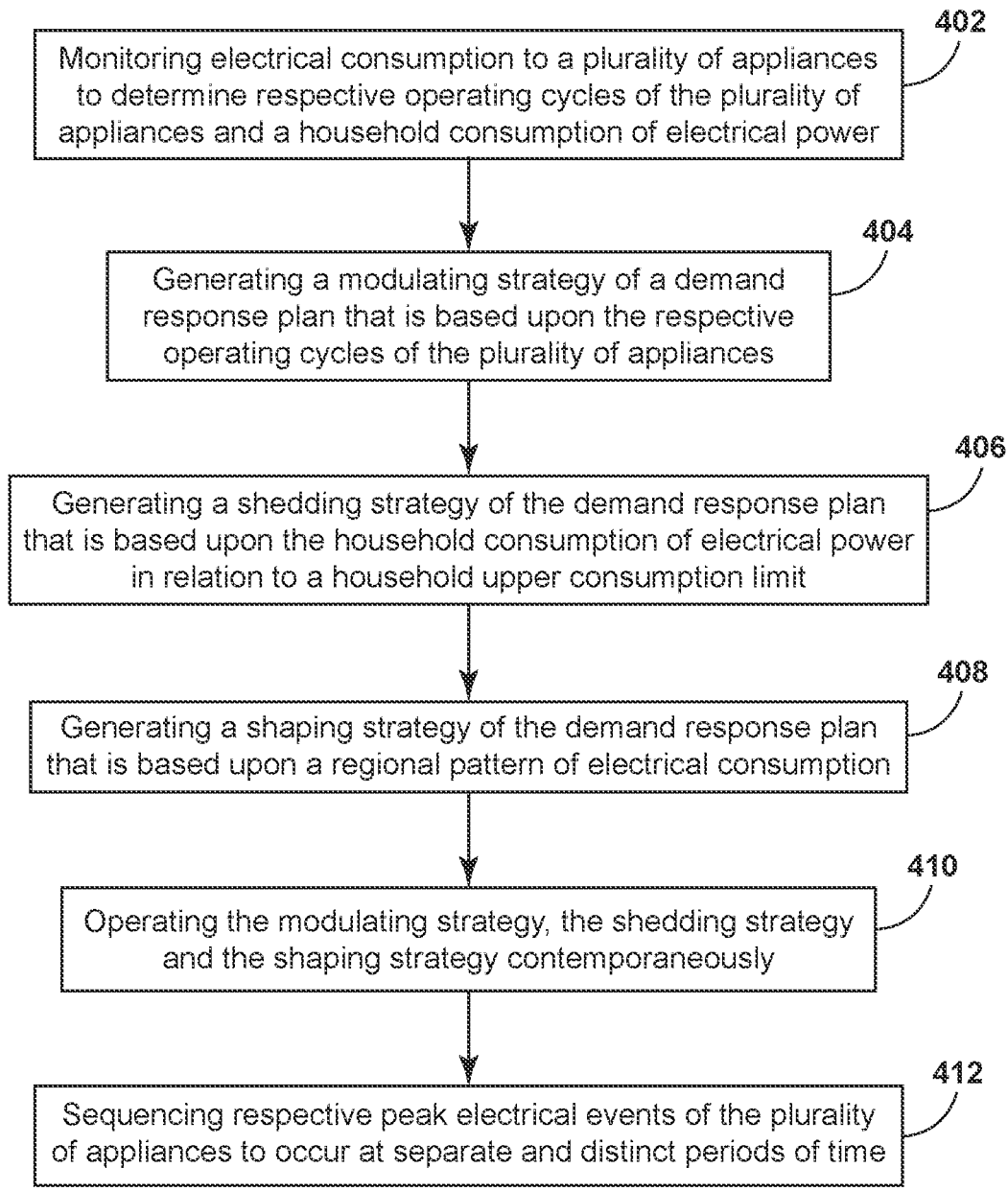
FIG. 10 is a linear flow diagram illustrating a method for managing household electrical consumption.

Referring now to FIGS. 1-5, 8, and 9, power consumption profiles 70 are shown in FIGS. 8 and 9 with respect to a dishwasher 82. The considerations included above with respect to the shifting strategy 36, the shedding strategy 50, and the modulating strategy 60 are similar to those described with respect to the refrigerator 84 and the washing machine 100. The dishwasher 82 can typically be viewed as a lower priority appliance 16 as this activation 38 can typically occur late at night with no supervision. In addition, delays in different cycles can be extended within the dishwasher 82 as there is a lesser concern for spoilage and bacterial growth within the dishwasher 82. In a refrigerator 84, maintaining a consistent temperature is related to the condition of food to be consumed. With respect to a washing machine 100, delaying a cycle too long may result in the growth of mildew and other bacterial populations within the clothing being processed. The dishes within a dishwasher 82, typically being solid surfaces, may have a lower concern for these considerations. Accordingly, the individual cycles of a dishwasher 82 can experience greater delays between the activations 38 of each particular cycle. Accordingly, the shifting strategy 36, the shedding strategy 50, and the modulating strategy 60 may be able to be implemented with greater variation with respect to the dishwasher 82 over other appliances 16 of the plurality of appliances 16. Accordingly, an operating cycle 62 for a dishwasher 82 that may typically take approximately two hours, may be extended to approximately four hours. However, because this operating cycle 62 may occur during the nighttime hours, a user of the dishwasher 82 may be unaware of the extended time period for completing this particular operating cycle 62.

Referring again to FIG. 9, the various power consumption profiles 70 of the individual elements of the dishwasher 82 can be broken down in various components and categories to take advantage of the shifting strategy 36, the shedding strategy 50, and the modulating strategy 60. In FIG. 8, the power consumption profile 70 is broken up according to each component of the dishwasher 82. Certain components can occur at the same time as one another, such as the heating element 104 and the motor 108 and pump 106 during a first portion of the cycle. FIG. 9 reflects a simplified breakdown of the operating cycle 62 for the dishwasher 82 to be three distinct portions that occur over time. Each of these power consumption profiles 70 can be operated using different combinations of the strategies of the demand response plan 10. Using the strategy of FIG. 8, the shifting strategy 36 and the modulating strategy 60 can be implemented to dictate when certain activations 38 occur for one component of the dishwasher 82 with reference to the other components of the dishwasher 82. By way of example, and not limitation, the interplay between activation 38 of the heating element 104 and activation 38 of the motor 108 and pump 106 for the dishwasher 82 can be varied to maximize the household consumption of electrical power 14 with respect to the dishwasher 82.

When viewed with respect to FIG. 9, the shedding strategy 50 and the shifting strategy 36 can be utilized to dictate when each portion of the operating cycle 62 is initiated to maximize the household consumption 18 of electrical power 14 and also to avoid reaching the household upper consumption limit 22 at any particular time. Using these strategies, use of electrical power 14 can be maximized over the course of a day to prevent unnecessary spikes in the household consumption 18 of electrical power 14.

Referring now to FIGS. 1-10, having described various aspects of the demand response plan 10 and the electricity management system 30, a method 400 is disclosed for managing household electrical consumption 42. According to the method 400, a step 402 includes monitoring electrical consumption 42 to a plurality of appliances 16. This monitoring helps the controller 32 to determine respective operating cycles 62 of the plurality of appliances 16 and also a household consumption 18 of electrical power 14. Using this information obtained during the monitoring, the controller 32 generates a modulating strategy 60 for a demand response plan 10 (404). As discussed above, this modulating strategy 60 is based upon respective operating cycles 62 of the plurality of appliances 16, as well as respective peak electrical events 90 within more than one appliance 16 of the plurality of appliances 16. According to the method 400, a step 406 includes generating a shedding strategy 50 of the demand response plan 10. This shedding strategy 50 is based at least upon the household consumption 18 of electrical power 14 in relation to a household upper consumption limit 22. As discussed above, the shedding strategy 50 can delay the activations 38 of certain appliances 16 or certain portions of the operating cycles 62 of the appliances 16 to avoid reaching this upper household consumption limit.

According to the method 400, a step 408 includes generating a shifting strategy 36 of the demand response plan 10 that is based upon a regional pattern 40 of electrical consumption 42. As discussed above, this regional pattern 40 of electrical consumption 42 can include pricing information with respect to electrical power 14, the availability of solar power, the availability of other alternative power sources, seasonal changes within the region, and other similar regional factors. In certain instances, the shifting strategy 36 can be configured to take into account the regional weather, including current weather patterns, and in certain instances, predicted weather patterns. According to the method 400, the controller 32 is configured to operate the modulating strategy 60, the shedding strategy 50, and the shifting strategy 36 contemporaneously (step 410). While operating these strategies contemporaneously, it is contemplated that the certain hierarchical priorities can be programed into the controller 32 for operating the plurality of appliances 16 and the various events within each operating cycles 62 for the various appliances 16.

Referring again to FIGS. 1-10, the method 400 can also include a step 412 of sequencing respective peak electrical events 90 to occur at separate and distinct time periods. This sequencing step 412 is used to maintain the household consumption 18 of electrical power 14 within a preferred consumption range 20 that is below the household upper consumption limit 22.

Using the demand response plan 10 described herein, the electricity management system 30 can control the household consumption 18 of electrical power 14 to be maintained within a preferred range, and also to avoid unnecessary or unwanted spikes in the consumption of electrical power 14. The use of the demand response plan 10 does not necessarily diminish the overall use of electrical power 14, however, managing the consumption of electrical power 14 can prevent these spikes within a particular household 12. The demand response plan 10 can also be used to efficiently use the resources of the user in operating the appliances 16 of the household 12. These effects over a number of households 12 can prevent unwanted spikes in the use of electrical power 14 that can be used to minimize brown outs, blackouts, and other unwanted events with respect to the power grid. These unwanted effects to the power grid can be avoided by managing the consumption of electrical power 14 within the houses that obtain electrical power 14 from the power grid.

According to another aspect of the present disclosure, an electricity management system for a residential setting includes a controller that is coupled with a plurality of appliances. A plurality of sensors are coupled with the controller and respectively coupled to the plurality of appliances. The controller cooperates with the plurality of sensors and the plurality of appliances to generate a demand response plan for delivering electrical power to the plurality of appliances. The demand response plan includes a shifting strategy that is configured to sequence activations of the plurality of appliances and a delivery of electrical power depending on a regional pattern of electrical consumption. The demand response plan includes a shedding strategy that is configured to maintain a household consumption of electrical power below a household upper consumption limit. The controller selectively deactivates at least one appliance of the plurality of appliances in response to the household consumption of electrical power reaching the household upper consumption limit. The demand response plan includes a modulating strategy. The respective operating cycles of the plurality of appliances are selectively conducted by the controller to maintain the household consumption of electrical power within a preferred consumption range that is below the household upper consumption limit. The shifting strategy, the shedding strategy and the modulating strategy are implemented contemporaneously.

According to another aspect, the regional pattern of electrical consumption is at least partially defined by a regional cost of electrical power.

According to yet another aspect, the controller using the modulating strategy cooperates with the plurality of appliances to activate respective peak electrical events of the plurality of appliances in a sequential pattern.

According to another aspect of the present disclosure, the respective peak electrical events occur at separate and distinct periods of time.

According to another aspect, the plurality of appliances includes a refrigerator, a dishwasher and a laundry appliance.

According to yet another aspect, the respective peak electrical events include operation of a refrigerator compressor, operation of a heating element of a dishwasher and operation of at least one of a heating element and a motor for a laundry appliance.

According to another aspect of the present disclosure, the shifting strategy, the shedding strategy and the modulating strategy are implemented hierarchically. The controller implements the modulating strategy as a primary strategy. When the modulating strategy is inconsistent with the shedding strategy or the shifting strategy, the controller implements the modulating strategy.

According to another aspect, the controller implements the shedding strategy as a secondary strategy, and when the shedding strategy is inconsistent with the shifting strategy, the controller implements the shedding strategy.

According to yet another aspect, an electricity management system for a residential setting includes a controller that is coupled with a plurality of appliances. A plurality of sensors are coupled with the controller and respectively coupled to the plurality of appliances. The controller cooperates with the plurality of sensors and the plurality of appliances to generate a demand response plan for delivering electrical power to the plurality of appliances. The demand response plan includes a shifting strategy that regulates a delivery of electrical power based upon a regional pattern of electrical consumption. The demand response plan includes a shedding strategy that maintains a household consumption of electrical power below a household upper consumption limit. The demand response plan includes a modulating strategy based upon the respective operating cycles of the plurality of appliances that prevents a simultaneous peak electrical event within more than one appliance of the plurality of appliances. The shifting strategy, the shedding strategy and the modulating strategy are implemented contemporaneously.

According to another aspect of the present disclosure, the controller implements the shifting strategy by activating and deactivating at least one appliance of the plurality of appliances according to the regional pattern of electrical consumption.

According to another aspect, the regional pattern of electrical consumption includes at least one of regional cost of electrical power and solar power availability.

According to yet another aspect, the controller implements the shedding strategy by selectively activating and deactivating the plurality of appliances to maintain the household consumption of electrical power below the household upper consumption limit.

According to another aspect of the present disclosure, the controller selectively deactivates at least one appliance of the plurality of appliances in response to the household consumption of electrical power reaching the household upper consumption limit.

According to another aspect, the controller implements the modulating strategy by sequencing the respective peak electrical events of the plurality of appliances to occur at separate and distinct periods of time to maintain the household consumption of electrical power within a preferred consumption range that is below the household upper consumption limit.

According to yet another aspect, the plurality of appliances includes a refrigerator, a dishwasher and a laundry appliance.

According to another aspect of the present disclosure, the respective peak electrical events include operation of a refrigerator compressor, operation of a heating element of a dishwasher and operation of at least one of a heating element and a motor for a laundry appliance.

According to another aspect, a method for managing household electrical consumption includes monitoring electrical consumption to a plurality of appliances to determine respective operating cycles of the plurality of appliances and a household consumption of electrical power. A modulating strategy of a demand response plan is generated that is based upon the respective operating cycles of the plurality of appliances. A shedding strategy of the demand response plan is generated that is based upon the household consumption of electrical power in relation to a household upper consumption limit. A shifting strategy of the demand response plan is generated that is based upon a regional pattern of electrical consumption. The modulating strategy, the shedding strategy and the shifting strategy are operated contemporaneously.

According to yet another aspect, the step of generating the modulating strategy includes determining respective peak electrical events of the respective operating cycles. The method further includes a step of sequencing the respective peak electrical events to occur at separate and distinct periods of time to maintain the household consumption of electrical power within a preferred consumption range that is below the household upper consumption limit.

According to another aspect of the present disclosure, the shifting strategy, the shedding strategy and the modulating strategy are implemented hierarchically. The controller implements the modulating strategy as a primary strategy. When the modulating strategy is inconsistent with the shedding strategy or the shifting strategy, the controller implements the modulating strategy.

According to another aspect, the controller implements the shedding strategy as a secondary strategy, and wherein when the shedding strategy is inconsistent with the shifting strategy, the controller implements the shedding strategy.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An electricity management system for a residential setting, the electricity management system comprising:

a controller that is coupled with a plurality of appliances; and a plurality of sensors that are coupled with the controller and respectively coupled to the plurality of appliances; wherein the controller cooperates with the plurality of sensors and the plurality of appliances to generate a demand response plan for delivering electrical power to the plurality of appliances;

the demand response plan includes a shifting strategy that is configured to sequence activations of the plurality of appliances and a delivery of electrical power depending on a regional pattern of electrical consumption, wherein the regional pattern of electrical consumption is based upon patterns of electricity consumption for a plurality of residential structures that includes said residential setting;

the demand response plan includes a shedding strategy that is configured to maintain a household consumption of electrical power below a household upper consumption limit, wherein the controller selectively deactivates at least one appliance of the plurality of appliances in response to the household consumption of electrical power reaching the household upper consumption limit;

the demand response plan includes a modulating strategy, wherein the respective operating cycles of the plurality of appliances are selectively conducted by the controller to maintain the household consumption of electrical power within a preferred consumption range that is below the household upper consumption limit; and the shifting strategy, the shedding strategy and the modulating strategy are implemented contemporaneously and hierarchically, wherein the controller implements the modulating strategy as a primary strategy.

2. The electricity management system of claim 1, wherein the regional pattern of electrical consumption is at least partially defined by a regional cost of electrical power.

3. The electricity management system of claim 1, wherein the controller using the modulating strategy cooperates with the plurality of appliances to activate respective peak electrical events of the plurality of appliances in a sequential pattern.

4. The electricity management system of claim 3, wherein the respective peak electrical events occur at separate and distinct periods of time.

5. The electricity management system of claim 1, wherein the plurality of appliances includes a refrigerator, a dishwasher and a laundry appliance.

6. The electricity management system of claim 5, wherein respective peak electrical events include operation of a refrigerator compressor, operation of a heating element of the dishwasher and operation of at least one of the heating element and a motor for the laundry appliance.

7. The electricity management system of claim 1, wherein when the modulating strategy is inconsistent with the shedding strategy or the shifting strategy, the controller implements the modulating strategy.

8. The electricity management system of claim 7, wherein the controller implements the shedding strategy as a secondary strategy, and wherein when the shedding strategy is inconsistent with the shifting strategy, the controller implements the shedding strategy.

9. An electricity management system for a residential setting, the electricity management system comprising:

a controller that is coupled with a plurality of appliances; and a plurality of sensors that are coupled with the controller and respectively coupled to the plurality of appliances; wherein the controller cooperates with the plurality of sensors and the plurality of appliances to generate a demand response plan for delivering electrical power to the plurality of appliances;

the demand response plan includes a shifting strategy that regulates a delivery of electrical power based upon a regional pattern of electrical consumption, wherein the regional pattern of electrical consumption is based upon patterns of electricity consumption for a plurality of residential structures that includes said residential setting;

the demand response plan includes a shedding strategy that maintains a household consumption of electrical power below a household upper consumption limit;

the demand response plan includes a modulating strategy based upon the respective operating cycles of the plurality of appliances that prevents a simultaneous peak electrical event within more than one appliance of the plurality of appliances; and the shifting strategy, the shedding strategy and the modulating strategy are implemented contemporaneously and hierarchically, wherein the controller implements the modulating strategy as a primary strategy.

10. The electricity management system of claim 9, wherein the controller implements the shifting strategy by activating and deactivating at least one appliance of the plurality of appliances according to the regional pattern of electrical consumption.

11. The electricity management system of claim 10, wherein the regional pattern of electrical consumption also includes at least one of regional cost of electrical power and solar power availability.

12. The electricity management system of claim 9, wherein the controller implements the shedding strategy that by selectively activating and deactivating the plurality of appliances to maintain the household consumption of electrical power below the household upper consumption limit.

13. The electricity management system of claim 12, wherein the controller selectively deactivates at least one appliance of the plurality of appliances in response to the household consumption of electrical power reaching the household upper consumption limit.

14. The electricity management system of claim 9, wherein the controller implements the modulating strategy by sequencing respective peak electrical events of the plurality of appliances to occur at separate and distinct periods of time to maintain the household consumption of electrical power within a preferred consumption range that is below the household upper consumption limit.

15. The electricity management system of claim 9, wherein the plurality of appliances includes a refrigerator, a dishwasher and a laundry appliance.

16. The electricity management system of claim 15, wherein respective peak electrical events include operation of a refrigerator compressor, operation of a heating element of the dishwasher and operation of at least one of the heating element and a motor for the laundry appliance.

17. A method for managing household electrical consumption, the method comprising steps of:

monitoring electrical consumption to a plurality of appliances to determine respective operating cycles of the plurality of appliances and a household consumption of electrical power;

generating a modulating strategy of a demand response plan that is based upon the respective operating cycles of the plurality of appliances, and determining respective peak electrical events of the respective operating cycles;

generating a shedding strategy of the demand response plan that is based upon the household consumption of electrical power in relation to a household upper consumption limit;

generating a shifting strategy of the demand response plan that is based upon a regional pattern of electrical consumption;

operating the modulating strategy, the shedding strategy and the shifting strategy contemporaneously and hierarchically, wherein a controller implements the modulating strategy as a primary strategy, and wherein when the modulating strategy is inconsistent with the shedding strategy or the shifting strategy, the controller implements the modulating strategy; and sequencing the respective peak electrical events to occur at separate and distinct periods of time to maintain the household consumption of electrical power within a preferred consumption range that is below the household upper consumption limit.

18. The method of claim 17, wherein the controller implements the shedding strategy as a secondary strategy, and wherein when the shedding strategy is inconsistent with the shifting strategy, the controller implements the shedding strategy.

* * * * *